(12) United States Patent
Steffanut et al.

(10) Patent No.: US 10,982,045 B2
(45) Date of Patent: Apr. 20, 2021

(54) CATALYST COMPOSITION FOR A POLYESTER MANUFACTURING PROCESS

(71) Applicant: CLARIANT PLASTICS & COATINGS LTD, Muttenz (CH)

(72) Inventors: Pascal Steffanut, Village-Neuf (FR); Mohamed Sidqi, Brunstatt (FR); Ernesto Dongiovanni, Horbourg-Wihr (FR); Jerome Abrahmi, Brunstatt (FR)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 15/513,925

(22) PCT Filed: Sep. 2, 2015

(86) PCT No.: PCT/EP2015/070075
§ 371 (c)(1),
(2) Date: Mar. 23, 2017

(87) PCT Pub. No.: WO2016/045923
PCT Pub. Date: Mar. 31, 2016

(65) Prior Publication Data
US 2017/0283549 A1   Oct. 5, 2017

(30) Foreign Application Priority Data

Sep. 24, 2014 (EP) .................................. 14003298

(51) Int. Cl.
| | | |
|---|---|---|
| *C08G 63/85* | (2006.01) | |
| *C08G 63/86* | (2006.01) | |
| *C08G 63/87* | (2006.01) | |
| *C08G 63/183* | (2006.01) | |

(52) U.S. Cl.
CPC ........... *C08G 63/85* (2013.01); *C08G 63/183* (2013.01); *C08G 63/866* (2013.01); *C08G 63/87* (2013.01)

(58) Field of Classification Search
CPC .... C08G 63/183; C08G 63/19; C08G 63/785; C08G 63/80; C08G 63/85; C08G 63/866; C08G 63/87; C08G 63/82; C08G 63/83; C08G 63/84; C08K 5/523; B01J 21/063; B01J 2231/14; B01J 2231/40; B01J 2531/46; B01J 31/0212; B01J 31/0225; B01J 31/0259; B01J 31/0261; B01J 31/04; B01J 31/1845; B01J 31/223
See application file for complete search history.

(56) References Cited

U.S. PATENT DOCUMENTS

| | | | | |
|---|---|---|---|---|
| 5,981,690 A * | 11/1999 | Lustig | .................... | C08G 63/85 524/709 |
| 6,034,203 A * | 3/2000 | Lustig | .................... | C08G 63/85 524/777 |
| 6,080,834 A * | 6/2000 | Putzig | .................. | B01J 31/0212 502/103 |
| 6,255,441 B1 * | 7/2001 | Putzig | ..................... | B01J 27/14 528/176 |
| 2004/0254330 A1 * | 12/2004 | Duan | .................... | C08G 63/81 528/275 |
| 2005/0215809 A1 * | 9/2005 | Putzig | .................... | C08G 63/85 558/102 |
| 2008/0260979 A1 * | 10/2008 | Yokoyama | .............. | B29C 31/04 428/35.7 |
| 2009/0005531 A1 * | 1/2009 | Thomspon | ............. | C08G 63/80 528/279 |
| 2013/0131239 A1 * | 5/2013 | Hill | ........................ | C07F 9/3808 524/133 |
| 2017/0283549 A1 * | 10/2017 | Steffanut | ................ | C08G 63/85 |

OTHER PUBLICATIONS

TYZOR® PC-64 Organic Titanate, May 2012 (Year: 2012).*

* cited by examiner

*Primary Examiner* — Ling Siu Choi
*Assistant Examiner* — Gennadiy Mesh
(74) *Attorney, Agent, or Firm* — Morgan, Lewis & Bockius LLP

(57) ABSTRACT

A catalyst composition for a polyester manufacturing process, comprising a titanium catalyst and/or an antimony catalyst as main catalyst, and either
(i) at least one co-catalyst A, or
(ii) at least one co-catalyst B and at least one co-catalyst C, or
(iii) a combination thereof, and
wherein co-catalyst A is selected from the group consisting of a metal salt of an alkyl or an aryl phosphinic acid, or a metal salt of an alkyl or aryl diphosphinic acid, or a combination thereof, and co-catalyst B is selected from the group consisting of an alkyl or aryl phosphinic acid, an alkyl or aryl diphosphinic acid a combination thereof, and co-catalyst C selected from the group of a metal salt, a metal hydroxide or a metal organyl compound.

5 Claims, No Drawings

CATALYST COMPOSITION FOR A POLYESTER MANUFACTURING PROCESS

The present invention relates to a catalyst composition for a polyester manufacturing process.

Polyesters such as, for example, polyethylene terephthalate, polytrimethylene terephthalate and polybutylene terephthalate, are a class of important industrial polymers, used in large quantities in the manufacture of textile fibres, packaging films and containers.

Polyesters are usually prepared industrially in a two stage catalyzed process. The first stage is the esterification reaction between a dicarboxylic acid and a polyol. In a second stage said esterification reaction is followed by a polycondensation step at higher temperatures resulting in the final polyester formation.

Numerous compounds have been proposed as esterification, transesterification or polycondensation catalysts. Antimony and titanium complexes, preferably in the form of alcoholic solutions, are the most frequently used catalysts in the polyester process. However, in some cases, certain drawbacks in reactivity, stability and appearance of the final product occur.

US 2009/0005531 discloses a method for increasing the solid state polymerization rates of organic titanate catalyzed polyester. The method comprises in a first step, reacting a dicarboxylic acid or a $C_1$-$C_3$ dicarboxylic diester with a diol at a suitable temperature and pressure to effect esterification or transesterification to prepare a precondensate. In a second step the precondensate is reacted to effect polycondensation at a suitable temperature and pressure to prepare a high molecular weight polyester. In a third step, the molecular weight and viscosity of the polyester is increased further. The presence of phosphinic acid compounds provide for higher molecular weight build up, or viscosity increase during the solid step polymerization step. However, the reaction speed and the color improvement of said catalyst composition is not satisfying.

US 2013/0131239 discloses a method for producing mixtures of alkylphosphonous acids and dialkylphosphinic acids salts. Said compounds have flame-retardant properties and may therefore be used in polymer compositions as flame-retardant agent. In some applications, these phosphorus-based additives exhibit flame retardancy just as high as the halogenated equivalents thereof.

In EP 0 699 708 calcium phosphinates and aluminum phosphinates are described to have excellent flame-retardant action in polyester plastics, while other metal salts of the same phosphinic or diphosphinic acids result in a considerably poorer flame-retardant action.

US 2013/0184414 discloses a process for preparation of polyester resin in the presence of a catalyst system comprising an antimony compound and inorganic tin compound.

WO 2005/097321 discloses a composition comprising a titanium compound, a phosphite ester, and optionally a solvent for producing polyesters. However, these catalyst combinations show average activities. As an example, the phosphites, in spite of a good effect on the coloration of the final material, may even slow down the activity of the catalyst they are added to.

The problem of the present invention is to provide a catalyst composition which is more efficient than the known catalytic systems and provides a reduced coloration of the final polyester product.

The problem is solved with the use of a co-catalyst A according to claim 1. Further preferred embodiments are subject of the dependent claims.

Surprisingly, it was found a catalyst composition for a polyester manufacturing process, comprising a titanium catalyst and/or an antimony catalyst as main catalyst, and either
(i) at least one co-catalyst A, or
(ii) at least one co-catalyst B and at least one co-catalyst C
(iii) or a combination of least one co-catalyst A, at least one co-catalyst B and at least one co-catalyst C
results extremely efficient in a final polyester product having a significantly reduced coloration.

Co-catalyst A is selected from the group consisting of a metal salt of an alkyl or an aryl phosphinic acid, or a metal salt of an alkyl or aryl diphosphinic acid, or a combination thereof. Co-catalyst B is selected from the group consisting of an alkyl or aryl phosphinic acid, an alkyl or aryl diphosphinic acid a combination thereof. Co-catalyst C is selected from the group consisting of a metal salt, a metal hydroxide or a metal organyl compound. That is, in all cases (i), (ii) and (iii), the catalytic composition comprises a metal ion as well as an alkyl or an aryl phosphinic acid, or an alkyl or aryl diphosphinic acid or a combination thereof. They are present in the catalyst composition according to the present invention either as mixture or as single molecules. In particular the presence of the metal ions, either in form of the co-catalyst A (since co-catalyst A is a metal salt) or in form of the co-catalyst C plays a key role for the reaction speed and the color improvement.

Co-catalyst A or the combination of co-catalyst B and co-catalyst B or a combination thereof have a better impact on the catalyst activity of the main catalyst versus the known phosphites. In addition, the efficiency of polyester manufacturing process could be increased significantly. The polymerization time is reduced at all stages of the polyester synthesis, the generation of degradation products is reduced and the physical properties of the polyesters are improved.

The main catalyst of such a catalyst composition is a titanium catalyst or an antimony catalyst or a combination thereof. Both of them may be the only main catalyst in the catalyst composition, but it is also possible that the catalyst composition comprises a combination of a titanium catalyst and an antimony catalyst.

Within the context of the present invention a titanium catalyst is preferably a tetrahydrocarbly titanate or a titanium chelate. Most preferably tetrahydrocarbyl titanates have the general formula $Ti(OR_{10})_4$, wherein each $R_{10}$ is independently from each other selected from the group consisting of $C_1$ to $C_{30}$, preferably $C_2$ to $C_{12}$ alkyl, cycloalkyl, alkaryl, and aryl, and each $R_{10}$ of the four $R^{10}$ of $Ti(OR_{10})_4$, may be the same or different. Examples are titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof.

Said titanium catalysts are also commercially available. Examples include, but are not limited to, titanium alkoxides such as titanium (IV) n-propoxide (Tilcom® NPT, Vertec® NPT, titanium (IV) n-butoxide, titanium chloride, triisopropoxide, titanium (IV) ethoxide, titanium (IV) 2-ethylhexyloxide (Tilcom® EHT, Vertec® EHT), TYZOR® TPT and TYZOR® TBT (tetra isopropyl titanate and tetra n-butyl titanate, respectively). Titanium tetra n-butoxide is most preferred.

Titanium chelates may be for example commercially available titanium bis-ammonium lactate, bis-acetylacetonate titanate, bis-ethyl acetoacetate titanate, bis triethanolamine titanate, or a combination of two and more thereof.

Commercially available titanium chelates are for example titanium bis-ammonium lactate, bis-acetylacetonate titanate, bis-ethyl acetonacetate titanate, bis triethanolaminetitanate or combinations of two or more thereof.

Within the context of the present invention an antimony catalyst is an antimony oxide, an antimony carboxylate or an antimony halide.

Preferably, the antimony catalyst is selected from one or more antimony trioxide, antimony tetraoxides, antimony pentoxides, antimony carboxylates such as antimony triacetate, antimony tristearate, antimony halide, such as antimony trichloride or antimony trifluoride. Antimony trioxide and antimony triacetate are most preferred.

In a preferred embodiment the catalyst composition comprises a titanium catalyst and/or an antimony catalyst as main catalyst, and at least one co-catalyst A, preferably one or two co-catalysts A. Optionally, such a catalyst composition can additionally comprise at least one co-catalyst C, which may result in a further color improvement. Preferably, co-catalyst A is selected from the group of the compounds of formula (I) and (II)

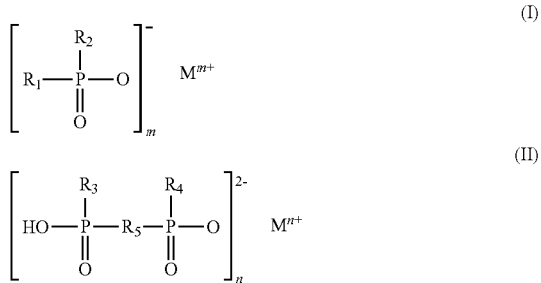

wherein
$R_1$, $R_2$, $R_3$ and $R_4$ are independently from each other linear or branched, saturated or unsaturated $C_1$ to $C_6$ alkyl and/or aryl residues and may be the same or different from each other, and
$R_5$ is a linear or branched, saturated or unsaturated $C_1$ to $C_{12}$ alkylene, $C_6$ to $C_{18}$ arylene, $C_6$ to $C_{18}$ alkyl arylene or $C_6$ to $C_{18}$ arylalkylene,
M is selected from the group consisting of aluminum, cobalt and zinc ions,
m is 2, 3 or 4, and
n is 1 or 2.

In another preferred embodiment of the present invention the catalyst composition comprises a titanium catalyst and/or an antimony catalyst as main catalyst and at least one co-catalyst B and at least one co-catalyst C. Preferably the expression at least stands for one or two co-catalysts B or C, respectively. Preferably, co-catalyst B is selected from the group of the compounds of formula (III) and (IV)

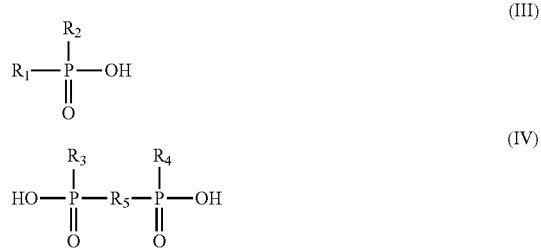

wherein
$R_1$, $R_2$, $R_3$ and $R_4$ are independently from each other linear or branched, saturated or unsaturated $C_1$ to $C_6$ alkyl and/or aryl residues and may be the same or different from each other, and
$R_5$ is a linear or branched, saturated or unsaturated $C_1$ to $C_{12}$ alkylene, $C_6$ to $C_{18}$ arylene, $C_6$ to $C_{18}$ alkyl arylene or $C_6$ to $C_{18}$ arylalkylene.

Co-catalyst C is preferably selected from the group consisting of a metal salt, a metal hydroxide or a metal organyl compound, whereby the metal of said metal salt, metal hydroxide or metal organyl compound is preferably selected from the group of aluminum, cobalt, zirconium or zinc. Preferably said co-catalyst C is selected from the group consisting of zinc acetate, zinc chloride, zinc nitrate, zinc sulfate, aluminum chloride, aluminum hydroxide, aluminum acetate, aluminum hydroxychloride, cobalt acetate, cobalt nitrate, cobalt chloride, cobalt acetylacetonate, cobalt naphthenate, cobalt hydroxide, cobalt salicate, and combinations thereof. In the catalyst combination one or more co-catalyst C may be present. Co-catalyst C is a color corrector of the polyesters. In addition, it can also play the role of a precursor for the metal complexes with phosphinic acids or diphosphinic acids, especially in case of cobalt and zinc complexes with phosphinic acid. Co-catalyst C may also be present in a catalyst composition comprising co-catalyst A in absence of co-catalyst B.

Most preferably in compounds of formula (I), (II), (III) and (IV), that is in co-catalyst A and in co-catalyst B, $R_1$ and $R_2$ are a linear or branched $C_1$ to $C_6$ alkyl or a phenyl, and $R_1$ and $R_2$ may be the same or different from each other. Ideally, $R_1$ and $R_2$ are independently from each other selected from the group consisting of methyl, ethyl, n-propyl, isopropyl, n-butyl, n-pentyl and phenyl.

Examples of preferred metal phosphonates of formula (I) are zinc dimethylphosphonate, zinc diethylphosphonate, dipropylphosphonate, zinc diisopropylphosphonate, zinc dibutylphosphonate, zinc dipentylphosphonate, zinc diphenylphosphonate, zinc ethyl methylphosphonate, zinc n-propyl methylphosphonate, zinc isopropyl methylphosphonate, zinc n-butyl methylphosphonate, zinc n-pentyl methylphosphonate, zinc phenyl methylphosphonate, zinc n-propyl ethylphosphonate, zinc isopropyl ethylphosphonate, zinc n-butyl ethylphosphonate, zinc n-pentyl ethylphosphonate, zinc phenyl ethylphosphonate, zinc isopropyl propylphosphonate, zinc n-butyl propylphosphonate, zinc n-pentyl propylphosphonate, zinc phenyl propylphosphonate, zinc n-butyl isopropylphosphonate, zinc n-pentyl iso-propylphosphonate, zinc phenyl isopropylphosphonate, zinc n-pentyl butylphosphonate, zinc phenyl butylphosphonate, zinc phenyl pentylphosphonate, cobalt dimethylphosphonate, cobalt diethylphosphonate, dipropylphosphonate, cobalt diisopropylphosphonate, cobalt dibutylphosphonate, cobalt dipentylphosphonate, cobalt diphenylphosphonate, cobalt ethyl methylphosphonate, cobalt n-propyl methylphosphonate, cobalt isopropyl methylphosphonate, cobalt n-butyl methylphosphonate, cobalt n-pentyl methylphosphonate, cobalt phenyl methylphosphonate, cobalt n-propyl ethylphosphonate, cobalt isopropyl ethylphosphonate, cobalt n-butyl ethylphosphonate, cobalt n-pentyl ethylphosphonate, cobalt phenyl ethylphosphonate, cobalt isopropyl propylphosphonate, cobalt n-butyl propylphosphonate, cobalt n-pentyl propylphosphonate, cobalt phenyl propylphosphonate, cobalt n-butyl isopropylphosphonate, cobalt n-pentyl isopropylphosphonate, cobalt phenyl isopropylphosphonate, cobalt n-pentyl butylphosphonate, cobalt phenyl butylphosphonate, cobalt phenyl pentylphosphonate, aluminum dimethylphosphonate, aluminum diethylphosphonate, dipropylphosphonate, aluminum diisopropylphosphonate, aluminum dibutylphosphonate, aluminum dipentylphosphonate, aluminum diphenylphosphonate, aluminum ethyl methylphosphonate, aluminum n-propyl methylphosphonate, aluminum isopropyl methylphosphonate, aluminum n-butyl methylphosphonate, aluminum n-pentyl methylphosphonate, aluminum phenyl methylphosphonate, aluminum n-propyl ethylphosphonate, aluminum isopropyl ethylphosphonate, aluminum n-butyl ethylphosphonate, aluminum n-pentyl ethylphosphonate, aluminum phenyl ethylphosphonate, aluminum isopropyl propylphosphonate, aluminum n-butyl propylphosphonate, aluminum n-pentyl propylphosphonate, aluminum phenyl propylphosphonate, aluminum n-butyl isopropylphosphonate, aluminum n-pentyl isopropylphosphonate, aluminum phenyl isopropylphosphonate, aluminum n-pentyl butylphosphonate, aluminum phenyl butylphosphonate, and aluminum phenyl pentylphosphonate. Most preferred are aluminum diethylphosphinate and/or zinc diethylphosphinate.

Examples of preferred phosphinic acids of formula (III) are dimethylphosphinic acid, diethylphosphinic acid, dipropylphosphinic acid, diisopropylphosphinic acid, dibutylphosphinic acid, dipentylphosphinic acid, diphenylphosphinic acid, ethyl methylphosphinic acid, n-propyl methylphosphinic acid, isopropyl methylphosphinic acid, n-butyl methylphosphinic acid, n-pentyl methylphosphinic acid, phenyl methylphosphinic acid, n-propyl ethylphosphinic acid, isopropyl ethylphosphinic acid, n-butyl ethylphosphinic acid, n-pentyl ethylphosphinic acid, phenyl ethylphosphinic acid, isopropyl propylphosphinic acid, n-butyl propylphosphinic acid, n-pentyl propylphosphinic acid, phenyl propylphosphinic acid, n-butyl isopropylphosphinic acid, n-pentyl isopropylphosphinic acid, phenyl isopropylphosphinic acid, n-pentyl butylphosphinic acid, phenyl butylphosphinic acid, and phenyl pentylphosphinic acid. Most preferred is diethyl phosphinic acid. Most preferably, a catalyst composition according to the present invention comprises diethyl phosphinic acid as co-catalyst B and a zinc salt as co-catalyst C, most preferably a zinc salt selected from the group consisting of zinc acetate, zinc chloride, zinc nitrate and zinc sulfate, ideally zinc acetate.

In another preferred embodiment the catalyst composition according to the present invention comprises a diphosphinic acid of formula (IV) as co-catalyst B or a metal salt of a diphosphinic acid of formula (II) as co-catalyst A or a combination thereof, wherein $R_3$, $R_4$, and $R_5$, M and n are defined as mentioned above. Most preferably, $R_3$ and $R_4$ are a linear or branched $C_1$ to $C_6$ alkyl or a phenyl, and $R_3$ and $R_4$ may be the same or different from each other. Preferably, $R_3$ and $R_4$ are independently from each other selected from the group of methyl, ethyl, n-propyl, isopropyl, n-butyl, n-pentyl and phenyl. Most preferably $R_5$ is selected from the group of methylene, ethylene, n-propylene, isopropylene, n-butylene, n-pentylene, n-octylene, n-dodecylne, phenylene, naphtylene, methylphenylene, ethylphenylene, tert-butylphenylene, methylnaphtylene, ethylnaphtylene, tert-butylnaphtylene, phenylmethylene, phenylethylene, phenylproplynes and phenylbutylene. Each individual combination of $R_3$, $R_4$ and $R_5$ of the compound of formula (II) or (IV) is part of the present invention and the compound may also be a corresponding aluminum salt, a corresponding cobalt salt or a corresponding zinc salt.

Examples of preferred metal salts diphosphonic acids of formula (II) are zinc ethylene-1,2-bis(ethylphosphonate), zinc 1-methylethylene-1,2-bis(cyclohexylphosponate), zinc phenylene-1,2-bis(ethylphosphonate), zinc methylphenylene-1,2-bis(ethylphosponate), cobalt ethylene-1,2-bis(ethylphosphonate), cobalt 1-methylethylene-1,2-bis(cyclohexylphosponate), cobalt phenylene-1,2-bis(ethylphosphonate), cobalt methylphenylene-1,2-bis(ethylphosphonate), aluminum ethylene-1,2-bis(ethylphosphonate), aluminum 1-methylethylene-1,2-bis(cyclohexylphosphonate), aluminum phenylene-1,2-bis(ethylphosphonate), and aluminum methylphenylene-1,2-bis(ethylphosphonate).

Examples of preferred diphosphonic acids of formula (IV) are ethylene-1,2-bis(ethylphosphinic acid), 1-methylethylene-1,2-bis(cyclohexylphosphinic acid), phenylene-1,2-bis(ethylphosphinic acid) and methylphenylene-1,2-bis(ethylphosphinic acid).

Optionally, the catalyst composition may additionally comprise a solvent D. Solvent D is preferably selected from the group consisting of monovalent, divalent and polyvalent alcohols. Preferably solvent D is selected from the group consisting of ethanol, propanol, isopropanol, butanol, preferably n-butanol, ethylene glycol, propylene glycol, isopropylene glycol, butylene glycol, 1-methyl propylene glycol, pentylene glycol, diethylene glycol, triethylene glycol, 2-ethyl hexanol and combinations thereof. Most preferably co-catalyst D is selected from the group of isopropanol, n-butanol and ethylene glycol or a mixture thereof. In the catalyst composition one or more solvents D may be present. However, preferably only one solvent D is present, since this increases the stability of the catalyst composition. If the catalyst composition according to the present invention comprises solvent D it is easy to handle and allows a liquid dosing.

Although it is possible to introduce the different catalytic ingredients of the catalyst composition successively into the polymerization vessel, the catalyst composition is preferably prepared before adding it to the polymerization vessel. Such a catalyst composition can be produced by mixing the individual components together. In addition, it is also possible that co-catalyst B and co-catalyst C are mixed together before adding said mixture to the main catalyst.

The catalyst composition can also be produced in addition to water, in a second solvent which is compatible with or does not interfere with an esterification or transesterification or polycondensation reaction.

Preferably, the catalyst composition comprises the main catalyst and
(i) at least one co-catalyst A, or
(ii) at least one co-catalyst B and at least one co-catalyst C
(iii) at least one co-catalyst A, at least one co-catalyst B and at least one co-catalyst C
and optionally solvent, in absence of a carboxylic compound, which is a starting compound of the polymerization reaction. Such a catalyst composition is ready for use and has excellent shelf stability. In a preferred embodiment the catalyst composition is solved in the alcohol which is a starting compound of the reaction, such as 1,4-butanediol for producing polybutylene terephthalate or 1,3-propylene glycol for producing polypropylene terephthalate.

The mixing of the
(i) main catalyst and the co-catalyst A, or of
(ii) the main catalyst, co-catalyst B and co-catalyst C or of
(iii) the main catalyst, co-catalyst A, co-catalyst B and co-catalyst C, and
optionally of solvent D and optionally of other optional ingredients can be carried out under an inert atmosphere, such as nitrogen, carbon dioxide, helium or a combination thereof. While being produced, the mixture can be stirred and can be carried out at a temperature in the range of from 0 to 100° C., preferably 20 to 50° C. Generally, the catalyst composition can comprise any amount of solvent, as long all the amount can substantially dissolve the composition.

The quantities of the main catalyst and co-catalyst A can be such that the molar ratio of the co-catalyst A to main catalyst in the catalyst composition is as follows:

Co-catalyst A: main catalyst is in the range of 0.1:1 to 50:1, preferably of 0.1:1 to 10:1, and most preferably from 1:1 to 4:1.

The quantities of the main catalyst, co-catalyst B and co-catalyst C can be such that the molar ratio of each co-catalyst to main catalyst in the catalyst composition is as follows:

Co-catalyst B: main catalyst is in the range of 0.1:1 to 50:1, preferably of 0.1:1 to 10:1, and most preferably from 1:1 to 4:1.

Co-catalyst C: main catalyst is in the range of 0.1:1 to 50:1, preferably of 0.5:1 to 10:1, and most preferably from 1:1 to 8:1.

If a solvent D is present in the catalyst composition according to the present invention it may contain preferably about 95% of solvent D and about 5% of co-catalyst A, preferably about 99% of solvent D and about 1% of co-catalyst A.

Alternatively, if a solvent D is present in the catalyst composition according to the present invention it may contain preferably about 95% of solvent D and about 5% co-catalyst B and co-catalyst C, preferably about 99% of solvent D and 1% of co-catalyst B and co-catalyst C, whereas co-catalyst B and co-catalyst C are preferably in a ratio as indicated above.

The present invention also discloses a method for the preparation of a polyester in the presence of the catalyst composition comprising co-catalyst A or a combination of co-catalyst B and co-catalyst C. The process comprises the steps of:
a) esterifying a carboxy compound preferably selected from the group consisting of dicarboxylic acid, a mono-ester thereof, a di-ester thereof or a carboxylic acid metal salt and an alcohol selected from the group of a monoalcohol, a diol or polyol by transesterification to obtain an esterified mixture (said reaction is called a direct esterification, DE)
b) polymerizing the esterified mixture at temperatures in the range of preferably 260° C. to 300° C. to obtain a polyester (said reaction is called polycondensation, PC).

The direct esterification is preferably carried out at a temperature in the range from 150° C. to 500° C., preferably 200° C. to 400° C., and most preferably 250° C. to 300° C. under a pressure in the range of from 1 mbar to 1 bar for a time period of from 0.2 to 20 hours, preferably 0.2 to 15 hours, and most preferably 0.5 to 10 hours. The molar ratio of the alcohol to carboxyl compound can be any ratio so long as the ratio can effect the production of an ester or polyester. Generally the ratio can be in the range of from 1:1 to 10:1, or 1:1 to 5:1, or 1:1 to 4:1. The product of said direct esterification is a low molecular weight oligomer having a total of 1 to 100, preferably 2 to 10 repeating units derived from the carboxyl compound and the alcohol.

The polymerization reaction is preferably carried out at a temperature in the range from 250° C. to 350° C., preferably 250° C. to 300° C., and most preferably 275° C. to 300° C. under a pressure in the range of from 1 mbar to 10 bar for a time period of from 1 to 4 hours.

A carboxy compound as starting compound of the direct esterification reaction may be any carboxyl compound, which when combined with an alcohol, can produce an ester or polyester. Examples include, but are not limited to, acids, esters, amides, acid anhydrides, acid halides, salts of carboxylic acid oligomers or polymers having repeating units derived from an acid, or combinations of two or more thereof.

Preferably, the dicarboxylic acid used as starting material of the direct esterification has the formula of

in which A is selected from the group consisting of a saturated or unsaturated, linear or branched alkylene group, a substituted or unsubstituted arylene group, substituted or unsubstituted alkenylene group, or combinations of two or more thereof. A has 0 to 30, preferably 1 to 25, more preferably 4 to 20, most preferred 4 to 15 carbon atoms. Examples of suitable dicarboxylic acids include, but are not limited to, terephthalic acid, isophthalic acid, naphthalic acid, succinic acid, adipic acid, phthalic acid, glutaric acid, oxalic acid, maleic acid, and combinations of two or more thereof.

In addition, monoacids may be used as potential chain termination agents in combination with the dicarboxylic acids such as acrylic acid or benzoic acid.

Preferably, the ester used as starting material of the direct esterification is selected from the group of the methyl esters of the before mentioned dicarboxylic acids. Examples of suitable esters include, but are not limited to, dimethyl adipate, dimethyl phthalate, dimethyl terephthalate, methyl benzoate, dimethyl glutarate, and combinations of two or more thereof.

Preferably, the carboxylic acid metal salts used as starting material of the direct esterification is a 5-sulfo-isophthalate metal salt and its ester having the formula of $(R_{11}O_2C)_2$-A-$S(O)_2M_1$ in which each $R_{11}$ can be the same or different and is hydrogen or an alkyl group containing 1 to 6, preferably 2, carbon atoms, A is a phenylene group and M1 can be an alkali metal ion such as sodium. An example of the ester is bis-glycolate ester of 5-sulfo isophthalate sodium salt.

The term polyol is intended to cover any suitable alcohol containing two or more hydroxyl groups known to those skilled in the art. Any alcohol that can esterify a dicarboxylic acid, a mono-ester thereof, a di-ester thereof or a carboxylic acid metal salt to produce a polyester can be used in the present invention. Examples of suitable alcohols include, but are not limited to ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, 1,6-hexanediol, cyclohexyl-1,4-bismethanol and combinations of two or more thereof, whereby monoalcohols may used as potential chain termination agents in combination with di-acids.

The catalyst composition of the present invention, that is,
(i) sum of the main catalyst and co-catalyst A, or
(ii) sum of the main catalyst, co-catalyst B and co-catalyst C, or
(iii) sum of the main catalyst, co-catalyst A, co-catalyst B and co-catalyst C,
can be present in the range of 0.0001 to 50,000 ppm by weight, preferably 0.001 to 10,000 ppm by weight, or 0.001 to 1000 ppm by weight relative to the reaction medium comprising carboxyl compound and alcohol.

It was found that the co-catalyst A significantly accelerates the direct esterification step as well as the polycondensation step of the polyester production. Therefore, preferably co-catalyst A and the main catalyst are added during the direct esterification step so that the main catalyst and the co-catalyst A are present in both production steps, that is during the direct esterification and during the polycondensation step.

Other ingredients such as conventional esterification and trans-esterification catalysts (e.g., manganese) and those enhancing catalyst stability or performance may be introduced to the production process concurrent with, or following, introduction of the catalyst composition of the present invention.

It is possible to add additives during the polymerization reaction such as processing stabilizers, flame retardant additives, antioxidants, UV absorbers, light stabilizers, metal deactivators, peroxide-destroying compounds, stabilization, nucleating agents or other additives. Preferably, in particular an antioxidant selected from the group consisting of a phosphite, phosphonite or other phosphorous based antioxidant may be added. Said phosphite or phosphonite can, for example, be triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, tris(2-tert-butyl-4-thio(2'-methyl-4,-hydroxy-5'-tert-butyl)phenyl-5-methyl) phenyl phosphite, 2,2',2"-nitrilo[triethyl tris(3,3',5,5'-tetra-tert-butyl-1,1'-biphenyl-2,2'-diyl) phosphite] and/or bis[2-methyl-4,6-bis(1,1-dimethylethyl)phenol]phosphorous acid ethyl ester. Most preferably, it is selected from the group consisting of tris (2,4-di-tert-butylphenyl)phosphite (available under the trade name Irgafos® 168 or 2,4,8,10-tetraoxa-3,9-diphosphaspiro (5.5)undecane, bis(2,4-di-tert-butyl-phenyl)pentaerythritol diphosphit (Ultranox® 626).

Experimental Part

Reaction Conditions and Analytical Evaluation of the Polyesters:

The polycondensation progress is controlled by measuring of differential torque value (ΔC) of the mixing device. This parameter depends on the viscosity change of reaction mixture. For every PET synthesized, ΔC is set to 15 Nm as a typical value for PET with a reduced viscosity between 70-78 mL/g. Once this value is attained, the reactor is opened and the polymer collected. The time of beginning of polycondensation (t0=0 min) is taken when the reactor pressure reaches 20 mbar.

Three experimental techniques are used to determine properties of PET obtained during this study.

1. Capillary Viscosimetry Analysis (Method ASTM D4603).

This technique allows the measurement of the intrinsic viscosity of PET in solution from the study of the flow time of pure solvent (t0) and of polymer solution (t). Different data characterizing the polymer viscosity can be calculated by this method:

Relative viscosity→$\eta_{rel}=t/t0$

Specific viscosity→$\eta_{sp}=(t-t0)/t0$

Reduced viscosity→$\eta_{red}=(t-t0)/C*t0$

In the literature, people skilled in the art have managed to establish a model to deduce directly from these expressions of viscosity: the intrinsic viscosity ([η]), number average molar mass and weight average molar mass (Mn, Mw) and the average degrees of polymerization DPn. We used two models for PET on the range of reduced viscosity: 5 ml/g<$\eta_{red}$<100 mL/g. One model to calculation for intrinsic viscosity is:

$$[\eta] = \frac{\sqrt{2 \times (\eta_{sp} - \text{Ln } \eta_{rel})}}{C}$$

The other model was developed for the determination of molar mass of PET, with the following equations:

$\overline{M}_n = 228.9 \times \eta_{red} - 1333$ $\overline{M}_w = 613.2 \times \eta_{red} - 3753.4$ $\overline{DP}_n = 1.19 \times \eta_{red} - 6.97$ 2. Differential Scanning Calorimetry Analysis (DSC)

DSC is a thermal analysis of the obtained polymer. t allows to determine the melting, crystallization and glass transition temperature. The temperature program has a first temperature ramp (from 35 to 275° C.) with a heating rate of 10° C./min, a cooling step at 10° C./min and a second heating ramp at 10° C./min. The analysis is run under nitrogen. From the first heating ramp we determine: the cold-crystallization temperature (Tc1), crystallization enthalpie (ΔHc1), melting temperature (Tm1) and melting enthalpy (ΔHm1). The degree of crystallization (χc1) is calculated using the following equation:

$$\chi_{c1} = \frac{\Delta H_{m1} - \Delta H_{c1}}{\Delta H_0} \times 100$$

ΔH0: melting enthalpy of pure single crystal of PET (117.6 J/g)

From the cooling ramp we find the melt-crystallization temperature (Tc2) and crystallization enthalpy (ΔHc2). From the second heating ramp we determine: the glass transition temperature (Tg3), the cold-crystallization temperature (Tc3), crystallization enthalpy (ΔHc3), the degree of crystallinity (χc3), melting temperature (Tm3), and melting enthalpy (ΔHm3).

$$\chi_{c3} = \frac{\Delta H_{m3} - \Delta H_{c3}}{\Delta H_0} \times 100$$

3. Nuclear Magnetic Resonance Spectroscopy (NMR)

1H-NMR is used to quantify the amount of diethylene glycol (so called DEG) in the chain. The DEG is formed during the synthesis by an etherification reaction. It is very important to measure the rate of DEG because it can influence the mechanical and thermal properties of PET. A large amount of DEG can reduce the glass transition temperature, melting temperature and the crystallization rate.

All analyzes are performed in a solvent mixture of deuterated chloroform (CDCl3)/trifluoroacetic acid (TFA) (3/1) (V/V)

The DEG rate (RDEG) is calculated from the integration of area proton peaks for different forms of DEG in the macromolecular PET chain appearing in between 4 ppm and 5 ppm.

$$\text{Rate}_{DEG} = \frac{I_c}{I_b + I_c + I_e + I_f} \times 100$$

Experimental Results

The reactor can synthesize around 3 kilograms (3072 g theoretical amount, 16 moles of PET) of polymer for each run (batch), all PETs are synthesized from 16 mol of terephthalic acid (TA) and 19.2 mol of ethylene glycol (EG) monomers that are used in the PET industry. The catalysts based on titanium and antimony, the phosphorus additives and color correction based metal salts were used in the formulation of PET. All products, their chemical structure, properties and quantity were determined by appropriate analytical methods.

Catalyst Mixture Preparation

The different components (1), (2), (3) and (4) of the catalytical system can be added separately during the polymerization process or ready-to-use mixtures can be prepared in advance by mixing the constituents following a given ratio in a solvent. This solution is then introduced to the process in the direct esterification or the polycondensation steps.

Typical quantities used per batch in polymerization for each individual component (Monomers (M) and catalysis formulations)

| Type | Products | Amount used per batch |
|---|---|---|
| M | Terephthalic acid | 16 mol. |
| M | Ethylene glycol | 19.2 mol. |
| 1 | Tetrabutyl titanate | 7 ppm Ti |
| 1 | Antimony acetate | 250 ppm Sb |
| 1 | Antimony trioxide | 250 ppm Sb |
| 2 | diethylphosphinic acid - (DEPS) | 5 ppm P |
| 2 | Aluminum(III)diethylphosphinate - (Al(DEP)3) | 5 ppm P |
| 2 | Ethylen-1,2-bis(ethylphosphinic acid) - (DiPOS) | 5 ppm P |
| 3 | Cobalt (II) acetate tetrahydrate | 25 ppm Co |
| 3 | Zinc (II) acetate | 56 ppm Zn |
| 3 | Zinc (II) diethylphosphinate (Zn(DEP)2) | 56 ppm Zn |
| 4 | Ethylene glycol | |

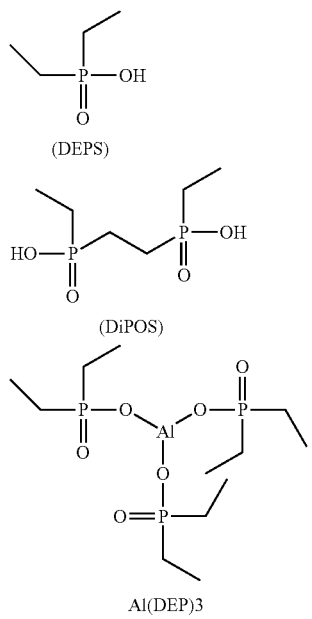

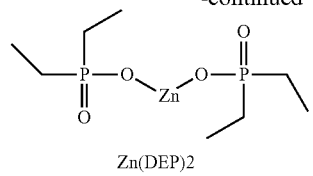

Zn(DEP)2

Example of Catalyst Mixture Preparation:

In a typical titanium based catalyst preparation, 0.15 grams of Ti(OBu)$_4$, 0.32 grams of Cobalt acetate tetrahydrate and 0.06 grams of diethylphosphinic acid (DEPS) are diluted into 10 ml of ethylene glycol. The transparent violet solution is stirred for 90 minutes at room temperature and used as catalyst for the example 4 (table 1).

An equivalent formulation is stored for one additional week and evaluate in another polymerization trial. The aged solution is shown to perform similarly to the freshly prepared one.

In a typical antimony based catalyst preparation, 0.92 grams of Sb(OAc)$_3$, 0.32 grams of Cobalt acetate tetrahydrate and 0.05 grams of diethylphosphinic acid (DEPS) are diluted into 10 ml of ethylene glycol. The transparent violet solution is stirred for 90 minutes at room temperature and used as catalyst for the example 19 (table 3).

An equivalent formulation is stored for one additional week and evaluate in another polymerization trial. The aged solution is shown to perform similarly to the freshly prepared one.

Direct Esterification Step 16 mol (2656 g) of Terephthalic acid (AT) is esterified with 19.2 mol of ethylene glycol EG (1190 g) under a nitrogen pressure of 6.6 bar and a temperature of 275° C. The molar ratio EG/AT is equal to 1.2. The catalysts and the cocatalysts or the ready-to-use mixture in ethylene glycol are introduced by an adapted device to the reactor. The agitator was turned on and the temperature increased to 275° C. over a period of about 2.5 hours. The contents were esterified by holding under agitation at 275° C. and a pressure of 120 mm Hg, and at 280° C. and a pressure of 30 mm Hg.

The progress of the reaction is controlled by the amount of water recovered named the "conversion". When the direct esterification step was completed (no water distilled off), the polycondensation step is started.

Polycondensation Step

The polycondensation step consists of coupling the PET oligomers formed during the esterification step, by transesterification reactions (also referred as exchange reactions) alcohol-ester which lead to release the excess of ethylene glycol molecules. The reaction takes place at 285° C. under reduced pressure of 0.7 mbar. The contents of the kettle were held under agitation at 285° C. at 1 to 2 mm Hg pressure for a time sufficient to reach 15 ounce-inch (0.106 Newton-meter) torque as measured by an Electro-Craft Motomatic torque controller. The time for this step was recorded as the Finish Time, and varied with the catalyst system used. The polymer melt was then poured into a water bath to solidify the melt, and the resultant solid annealed at 0° C. for 12 hours and ground to pass through a 2 mm filter for color measurements using a spectrophotometer.

Results

TABLE 1

Polymerisation results with titanium based catalysts (1a and 1b being the references)

| Example | "(1)" | (Ti) ppm | IS | "(2)" | (P) ppm | "(3)" | (M) ppm | IS | t1 | t2 | t1 + t2 | Δ |
|---|---|---|---|---|---|---|---|---|---|---|---|---|
| 1a | Ti(OBu)$_4$ | 7 | 2 | none | 0 | none | 0 | — | 105 | 76 | 181 | 0 |
| 1b | Ti(OBu)$_4$ | 7 | 1 | none | 0 | none | 0 | — | 90 | 80 | 170 | −11 |
| 2 | Ti(OBu)$_4$ | 7 | 2 | DEPS | 5 | Co(OAc)$_2$ | 25 | 1 | 95 | 52 | 147 | −34 |
| 3 | Ti(OBu)$_4$ | 7 | 2 | DiPOS | 5 | Co(OAc)$_2$ | 25 | 1 | 90 | 60 | 150 | −31 |
| 4 | Ti(OBu)$_4$ | 7 | 1 | DEPS | 5 | Co(OAc)$_2$ | 25 | 1 | 85 | 52 | 137 | −44 |
| 5 | Ti(OBu)$_4$ | 7 | 1 | DEPS | 10 | Co(OAc)$_2$ | 25 | 1 | 85 | 61 | 146 | −35 |
| 6 | Ti(OBu)$_4$ | 7 | 1 | DEPS | 2.5 | Co(OAc)$_2$ | 25 | 1 | 85 | 54 | 139 | −42 |
| 7 | Ti(OBu)$_4$ | 7 | 1 | DiPOS | 5 | Co(OAc)$_2$ | 25 | 1 | 85 | 61 | 146 | −35 |
| 8 | Ti(OBu)$_4$ | 7 | 1 | DiPOS | 2.5 | Co(OAc)$_2$ | 25 | 1 | 90 | 61 | 151 | −30 |
| 9 | Ti(OBu)$_4$ | 7 | 2 | DEPS | 5 | Co(OAc)$_2$ | 25 | 1 | 90 | 50 | 140 | −41 |
| 10 | Ti(OBu)$_4$ | 7 | 1 | Al(DEP)3 | 5 | Co(OAc)$_2$ | 25 | 1 | 95 | 52 | 147 | −34 |
| 11 | Ti(OBu)$_4$ | 7 | 1 | DEPS | 5 | Zn(OAc)$_2$ | 56 | 1 | 90 | 37 | 127 | −54 |
| 12 | Ti(OBu)$_4$ | 7 | 1 | DEPS | 5 | Co(OAc)$_2$ | 25 | 1 | 85 | 51 | 136 | −45 |
| 13 | Ti(OBu)$_4$ | 7 | 1 | DiPOS | 5 | Zn(OAc)$_2$ | 56 | 1 | 90 | 37 | 127 | −54 |
| 14 | Ti(OBu)$_4$ | 7 | 2 | DEPS | 5 | Zn(OAc)$_2$ | 56 | 1 | 90 | 37 | 127 | −54 |
| 15 | Ti(OBu)$_4$ | 7 | 2 | DiPOS | 5 | Zn(OAc)$_2$ | 56 | 1 | 85 | 39 | 124 | −57 |
| 16 | Ti(OBu)$_4$ | 7 | 1 | none | 0 | Zn(OAc)$_2$ | 56 | — | 85 | 43 | 128 | −53 |

Abreviations -
IS: introduction step of the ingredients.
IS 1: co-catalyst introduced at DE step.
IS 2: main catalyst introduced at PC step.
DE: direct esterification.
PC: polycondensation.
t1: DE time/min.
t2: PC time/min

TABLE 2

Qualitiative color measurement (1a and 1b being the references)

| Example | "(1)" | (Ti) ppm | IS | "(2)" | (P) ppm | "(3)" | (M) ppm | IS | PET color |
|---|---|---|---|---|---|---|---|---|---|
| 1a | Ti(OBu)$_4$ | 7 | 2 | none | 0 | none | 0 | — | yellow |
| 1b | Ti(OBu)$_4$ | 7 | 1 | none | 0 | none | 0 | — | yellow |
| 2 | Ti(OBu)$_4$ | 7 | 2 | DEPS | 5 | Co(OAc)$_2$ | 25 | 1 | Light yellow |
| 3 | Ti(OBu)$_4$ | 7 | 2 | DiPOS | 5 | Co(OAc)$_2$ | 25 | 1 | Light yellow |
| 4 | Ti(OBu)$_4$ | 7 | 1 | DEPS | 5 | Co(OAc)$_2$ | 25 | 1 | Light yellow |
| 5 | Ti(OBu)$_4$ | 7 | 1 | DEPS | 10 | Co(OAc)$_2$ | 25 | 1 | Light yellow |
| 6 | Ti(OBu)$_4$ | 7 | 1 | DEPS | 2.5 | Co(OAc)$_2$ | 25 | 1 | Light yellow |
| 7 | Ti(OBu)$_4$ | 7 | 1 | DiPOS | 5 | Co(OAc)$_2$ | 25 | 1 | Light yellow |
| 8 | Ti(OBu)$_4$ | 7 | 1 | DiPOS | 2.5 | Co(OAc)$_2$ | 25 | 1 | Light yellow |
| 9 | Ti(OBu)$_4$ | 7 | 2 | DEPS | 5 | Co(OAc)$_2$ | 25 | 1 | Light yellow |
| 10 | Ti(OBu)$_4$ | 7 | 1 | Al(DEP)3 | 5 | Co(OAc)$_2$ | 25 | 1 | Light yellow |
| 11 | Ti(OBu)$_4$ | 7 | 1 | DEPS | 5 | Zn(OAc)$_2$ | 56 | 1 | grey |
| 12 | Ti(OBu)$_4$ | 7 | 1 | DEPS | 5 | Co(OAc)$_2$ | 25 | 1 | Light yellow |
| 13 | Ti(OBu)$_4$ | 7 | 1 | DiPOS | 5 | Zn(OAc)$_2$ | 56 | 1 | grey |
| 14 | Ti(OBu)$_4$ | 7 | 2 | DEPS | 5 | Zn(OAc)$_2$ | 56 | 1 | grey |
| 15 | Ti(OBu)$_4$ | 7 | 2 | DiPOS | 5 | Zn(OAc)$_2$ | 56 | 1 | grey |
| 16 | Ti(OBu)$_4$ | 7 | 1 | none | 0 | Zn(DEP)$_2$ | 56 | 1 | Light grey |

Abreviations -
IS: introduction step of the ingredients.
IS 1: co-catalyst introduced at DE step.
IS 2: main catalyst introduced at PC step.
DE: direct esterification.
PC: polycondensation

TABLE 3

Polymerisation results with antimony based catalysts (17a and 17b being the references)

| Example | "(1)" | (Sb) ppm | IS | "(2)" | (P) ppm | "(3)" | (M) ppm | IS | t1 | t2 | t1 + t2 | Δ |
|---|---|---|---|---|---|---|---|---|---|---|---|---|
| 17a | $Sb_2O_3$ | 200 | 1 | none | 0 | none | 0 |  | 90 | 80 | 170 | −19 |
| 17b | $Sb_2O_3$ | 200 | 2 | none | 0 | none | 0 | 1 | 105 | 84 | 189 | 0 |
| 18 | $Sb_2O_3$ | 200 | 2 | DEPS | 5 | $Co(OAc)_2$ | 25 | 1 | 100 | 55 | 155 | −34 |
| 19 | $Sb_2O_3$ | 200 | 1 | DEPS | 5 | $Co(OAc)_2$ | 25 | 1 | 85 | 63 | 148 | −41 |
| 20 | $Sb_2O_3$ | 200 | 1 | DiPOS | 5 | $Co(OAc)_2$ | 25 | 1 | 90 | 67 | 157 | −32 |
| 23 | $Sb_2O_3$ | 200 | 1 | Al(DEP)3 | 5 | $Co(OAc)_2$ | 25 | 1 | 90 | 62 | 152 | −37 |
| 24 | $Sb(OAc)_3$ | 200 | 1 | none | 0 | $Zn(DEP)_2$ | 56 | 1 | 85 | 45 | 130 | −59 |

Abreviations -
IS: introduction step of the ingredients.
IS 1: co-catalyst introduced at DE step.
IS 2: main catalyst introduced at PC step.
DE: direct esterification.
PC: polycondensation.
t1: DE time/min.
t2: PC time/min

TABLE 4

Qualitative color measurement (17a and 17b being the references)

| Example | "(1)" | (Sb) ppm | IS | "(2)" | (P) ppm | "(3)" | (M) ppm | IS | color |
|---|---|---|---|---|---|---|---|---|---|
| 17a | $Sb_2O_3$ | 200 | 1 | none | 0 | none | 0 |  | Light yellow |
| 17b | $Sb_2O_3$ | 200 | 2 | none | 0 | none | 0 |  | Light yellow |
| 18 | $Sb_2O_3$ | 200 | 2 | DEPS | 5 | $Co(OAc)_2$ | 25 | 1 | Light yellow |
| 19 | $Sb_2O_3$ | 200 | 1 | DEPS | 5 | $Co(OAc)_2$ | 25 | 1 | Light yellow |
| 20 | $Sb_2O_3$ | 200 | 1 | DiPOS | 5 | $Co(OAc)_2$ | 25 | 1 | Light grey |
| 21 | $Sb_2O_3$ | 200 | 1 | $Al(DEP)_3$ | 5 | none | 0 |  | Light grey |
| 22 | $Sb(OAc)_3$ | 200 | 1 | $Al(DEP)_3$ | 5 | none | 0 |  | Light yellow |
| 23 | $Sb_2O_3$ | 200 | 1 | $Al(DEP)_3$ | 5 | $Co(OAc)_2$ | 25 | 1 | Light grey |
| 24 | $Sb(OAc)_3$ | 200 | 1 | none | 0 | $Zn(DEP)_2$ | 56 | 1 | white |

Abreviations -
IS: introduction step of the ingredients.
IS 1: co-catalyst introduced at DE step.
IS 2: main catalyst introduced at PC step.
DE: direct esterification.
PC: polycondensation

TABLE 5

Thermal and crystallization properties of PET synthesized with the new catalysts mixtures - DEG content measurements in %.

| Example | $T_{c1}$, $\Delta H_{c1}$ (°C, $J \cdot g^{-1}$) | $T_{m1}$, $\Delta H_{m1}$ (°C, $J \cdot g^{-1}$) | $X_{c1}$ (%) | $T_{c2}$, $\Delta H_{c2}$ (°C, $J \cdot g^{-1}$) | $T_{c3}$, $\Delta H_{c3}$ (°C, $J \cdot g^{-1}$) | $T_{m3}$, $\Delta H_{m3}$ (°C, $J \cdot g^{-1}$) | $X_{c3}$ (%) | $R_{DEG}$ (%) |
|---|---|---|---|---|---|---|---|---|
| 1a | 142/33 | 244/39 | 5.1 | 148/26 | 147/5 | 243/37 | 27 | 6.6 |
| 1b | 145/37 | 245/40 | 2.5 | 148/26 | 149/11 | 244/38 | 23 | 6.2 |
| 2 | 142/34 | 247/40 | 5.1 | 145/18 | 146/12 | 246/37 | 21 | 5.3 |
| 4 | 145/37 | 248/43 | 5.1 | 156/34 | 149/6 | 247/40 | 29 | 5 |
| 6 | 144/33 | 249/39 | 5.1 | 152/25 | 148/7 | 247/36 | 24 | 4.8 |
| 5 | 142/35 | 249/39 | 3.4 | 150/23 | 147/9 | 246/35 | 22 | 5 |
| 3 | 140/37 | 247/43 | 5.1 | 154/34 | 148/7 | 246/41 | 29 | 5.2 |
| 7 | 143/33 | 249/38 | 4.2 | 156/28 | 146/7 | 248/35 | 24 | 4.8 |
| 16 | 143/36 | 249/42 | 5.1 | 156/24 | 149/13 | 248/40 | 23 | 4.9 |
| 24 | 133/34 | 249/42 | 6.8 | 181/42 | ND*/0 | 248/39 | 33 | 4.9 |

Comparison examples: Polyesterification experiments of Ref 1 to 4 are conducted only with main catalysts. These catalysts were introduced either in the step 1 or the step 2. Ref 5 to 13 are conducted with a phosphorus source. The phosphorus source can be a phosphinite like Hostanox P-EPQ (PEPQ) or a phosphite like Irganox 168 (IRG 168). Carboxyethyl phosphinic acid (CEPA) was also evaluated. As described in the following table, the full reaction time improvements (sum) are quite limited.

| Example | catalyst | IS | Phosphorus | IS | DE (Min) | PC (Min) | Sum (Min) |
|---|---|---|---|---|---|---|---|
| ref 1 | Ti(OBu)$_4$ | 1 | none | "—" | 90 | 80 | 170 |
| ref 2 | Sb$_2$O$_3$ | 1 | none | "—" | 90 | 80 | 170 |
| ref 3 | Ti(OBu)$_4$ | 2 | none | "—" | 105 | 76 | 181 |
| ref 4 | Sb$_2$O$_3$ | 2 | none | "—" | 105 | 84 | 189 |
| ref 5 | Ti(OBu)$_4$ | 2 | P-EPQ | 1 | 100 | 113 | 213 |
| ref 6 | Ti(OBu)$_4$ | 2 | CEPA | 1 | 95 | 89 | 184 |
| ref 7 | Sb$_2$O$_3$ | 2 | P-EPQ | 1 | 100 | 89 | 189 |
| ref 8 | Sb$_2$O$_3$ | 2 | CEPA | 1 | 95 | 90 | 185 |
| ref 9 | Ti(OBu)$_4$ | 1 | P-EPQ | 1 | 90 | 113 | 203 |
| ref 10 | Ti(OBu)$_4$ | 2 | CEPA | 2 | 95 | 67 | 162 |
| ref 11 | Ti(OBu)$_4$ | 2 | P-EPQ | 2 | 100 | 77 | 177 |
| ref 12 | Ti(OBu)$_4$ | 2 | IRG 168 | 2 | 105 | 71 | 176 |
| ref 13 | Ti(OBu)$_4$ | 2 | IRG 168 | 1 | 97 | 87 | 184 |

Comparison examples: Polyesterification experiments of Ref 14 to 20 are conducted with reported cocatalysts (Zn and Co acetates). These cocatalysts were introduced either in the step 1 or the step 2. As described in the following table, the full reaction time is improved especially for the Zinc cocatalyst but the overall quality of the obtained polyester is rather poor (severe yellowing and low viscosity).

| Example | catalyst | IS | Phosphorus | IS | DE (Min) | PC (Min) | Sum (Min) |
|---|---|---|---|---|---|---|---|
| Ref 14 | Sb$_2$O$_3$ | 2 | Co(OAc)$_2$ | 1 | 100 | 58 | 158 |
| Ref 15 | Ti(OBu)$_4$ | 2 | Co(OAc)$_2$ | 1 | 100 | 57 | 157 |
| Ref 16 | Ti(OBu)$_4$ | 1 | Co(OAc)$_2$ | 1 | 85 | 58 | 143 |
| Ref 17 | Sb$_2$O$_3$ | 1 | Co(OAc)$_2$ | 1 | 95 | 60 | 155 |
| Ref 18 | Ti(OBu)$_4$ | 1 | Zn(OAc)$_2$ | 1 | 90 | 56 | 146 |
| Ref 19 | Sb$_2$O$_3$ | 1 | Zn(OAc)$_2$ | 1 | 90 | 50 | 140 |
| Ref 20 | Ti(OBu)$_4$ | 2 | Zn(OAc)$_2$ | 1 | 90 | 52 | 142 |

The invention claimed is:

1. Catalyst composition for a polyester manufacturing process, consistiing essentially of:

a titanium catalyst and/or an antimony catalyst, the titanium catalyst being selected from the group consisting of titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations thereof, and the antimony catalyst being selected from the group consisting of antimony trioxide and antimony triacetate; and (i) at least one co-catalyst A, or (ii) at least one co-catalyst B and at least one co-catalyst C, or (iii) a combination of at least one co-catalyst A, at least one co-catalyst B and at least one co-catalyst C, and wherein the co-catalyst A is selected from the group consisting of compounds of formula (I) and formula (II)

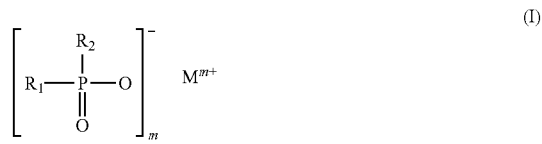

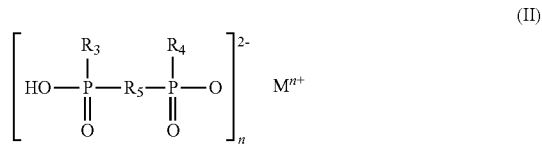

wherein $R_1$, $R_2$, $R_3$ and $R_4$ are each independently a linear or branched, saturated or unsaturated $C_1$ to $C_6$ alkyl or an aryl residue, $R_5$ is a $C_1$ to $C_{12}$ a linear or branched, saturated or unsaturated alkylene, a $C_6$ to $C_{18}$ arylene, a $C_6$ to $C_{18}$ alkyl arylene or a $C_6$ to $C_{18}$ arylalkylene, M is selected from the group consisting of aluminum, cobalt and zinc ions, m is 2, 3 or 4, and n is 1 or 2, and the co-catalyst B is selected from the group consisting of compounds of formula (III) and formula (IV)

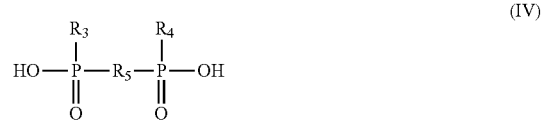

wherein $R_1$, $R_2$, $R_3$ and $R_4$ are each independently a linear or branched, saturated or unsaturated $C_1$ to $C_6$ alkyl or an aryl residue, and $R_5$ is a linear or branched, saturated or unsaturated $C_1$ to $C_{12}$ alkylene, a $C_6$ to $C_{18}$ arylene, a $C_6$ to $C_{18}$ alkyl arylene or a $C_6$ to $C_{18}$ arylalkylene, and the co-catalyst C is selected from the group consisting of a zinc acetate, zinc chloride, zinc nitrate, zinc sulfate, aluminum chloride, aluminum hydroxide, aluminum acetate, aluminum hydroxychloride, cobalt acetate, cobalt nitrate, cobalt chloride, cobalt acetylacetonate, cobalt naphthenate, cobalt hydroxide, cobalt salicate and cornbinations thereof; and (iv) optionally a solvent D, wherein:

a molar ratio of the co-catalyst A: the titanium and/or the antimony catalyst is in a range of 1:1 to 4:1;

a molar ratio of the co-catalyst B : the titanium and/or the antimony catalyst is in a range of 1:1 to 4:1;

a molar ratio of the co-catalyst C: the titanium and/or the antimony catalyst is in a range of 1:1 to 8:1.

2. Catalyst composition according to claim 1, wherein the catalyst system consists of
the titanium catalyst and/or the antimony catalyst and
the at least one co-catalyst B and
the at least one co-catalyst C.

3. Catalyst composition according to claim 1, wherein
the co-catalyst B is diethylphosphinic acid and
the co-catalyst C is selected from the group consisting of zinc acetate, zinc chloride, zinc nitrate and zinc sulfate.

4. Catalyst composition according to claim 1, wherein the solvent D is selected from the group consisting of monovalent, divalent and polyvalent alcohols.

5. Catalyst composition according to claim 4, wherein the solvent D is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol and combinations thereof.

* * * * *